(12) United States Patent
Abdalla et al.

(10) Patent No.: US 10,094,347 B2
(45) Date of Patent: Oct. 9, 2018

(54) NO FILTER NO RUN FILTER ASSEMBLY WITH AIR VENT

(75) Inventors: Wassem Abdalla, Cookeville, TN (US);
Eric R. Burgan, Baxter, TN (US);
Gerard Malgorn, Quimper (FR)

(73) Assignee: CUMMINS FILTRATION IP, INC., Columbus, IN (US)

( * ) Notice: Subject to any disclaimer, the term of this patent is extended or adjusted under 35 U.S.C. 154(b) by 631 days.

(21) Appl. No.: 13/193,943

(22) Filed: Jul. 29, 2011

(65) Prior Publication Data

US 2012/0024771 A1 Feb. 2, 2012

Related U.S. Application Data

(60) Provisional application No. 61/369,488, filed on Jul. 30, 2010.

(51) Int. Cl.
| | |
|---|---|
| *B01D 35/14* | (2006.01) |
| *B01D 35/02* | (2006.01) |
| *F02M 37/22* | (2006.01) |
| *B01D 29/21* | (2006.01) |
| *B01D 29/96* | (2006.01) |
| *B01D 35/153* | (2006.01) |
| *B01D 36/00* | (2006.01) |

(52) U.S. Cl.
CPC ............. *F02M 37/22* (2013.01); *B01D 29/21* (2013.01); *B01D 29/96* (2013.01); *B01D 35/153* (2013.01); *B01D 36/001* (2013.01); *B01D 2201/0415* (2013.01); *B01D 2201/291* (2013.01); *B01D 2201/305* (2013.01); *B01D 2201/316* (2013.01); *B01D 2201/4046* (2013.01)

(58) Field of Classification Search
CPC ...... B01D 2201/0415; B01D 2201/291; F02M 37/22

USPC ................................................. 210/234, 436
See application file for complete search history.

(56) References Cited

U.S. PATENT DOCUMENTS

| | | | | | |
|---|---|---|---|---|---|
| 3,567,130 | A | * | 3/1971 | Holt ............................... | 239/326 |
| 3,696,932 | A | * | 10/1972 | Rosenberg ..................... | 210/437 |
| 4,132,641 | A | * | 1/1979 | Elsworth ........................ | 210/808 |
| 5,643,446 | A | * | 7/1997 | Clausen ............. | B01D 17/0211 |
| | | | | | 210/184 |
| 5,709,242 | A | * | 1/1998 | Bergen ...................... | 137/533.11 |
| 5,846,417 | A | | 12/1998 | Jiang et al. | |

(Continued)

FOREIGN PATENT DOCUMENTS

| | | |
|---|---|---|
| EP | 1 108 456 | 6/2001 |
| EP | 1658121 | 5/2007 |

OTHER PUBLICATIONS

Oxford Dictionary, "Oxford Dictionary, Tenth Edition," ed. Judy Pearsall, pub. Oxford University Press, New York, 1999, 4 pages. (Year: 1999).*

(Continued)

*Primary Examiner* — Bobby Ramdhanie
*Assistant Examiner* — Denise R Anderson
(74) *Attorney, Agent, or Firm* — Foley & Lardner LLP

(57) ABSTRACT

A filter cartridge includes a filter media defining an interior space, and having a first end and a second end, a first end plate connected to the first end, and a second end plate connected to the second end. A pin is connected to the second end plate and extends downwardly into the interior space. The pin defines a flow passage therethrough that communicates the interior space with an outside of the filter cartridge.

13 Claims, 9 Drawing Sheets

(56) References Cited

U.S. PATENT DOCUMENTS

| | | | |
|---|---|---|---|
| 6,027,639 A * | 2/2000 | Lenhart et al. | 210/108 |
| 6,045,598 A * | 4/2000 | Fath | B01D 29/012 |
| | | | 55/490 |
| 6,709,588 B2 | 3/2004 | Pavlin et al. | |
| 6,884,349 B1 | 4/2005 | Jiang | |
| 7,014,766 B2 | 3/2006 | Mack et al. | |
| 7,147,110 B2 | 12/2006 | Clausen et al. | |
| 7,299,931 B2 | 11/2007 | Schachtrup et al. | |
| 7,572,306 B2 | 8/2009 | Hawkins et al. | |
| 7,655,140 B2 | 2/2010 | Wieczorek et al. | |
| 7,717,092 B2 | 5/2010 | Wieczorek et al. | |
| 7,749,383 B2 | 6/2010 | Jiang | |
| 7,867,387 B2 | 1/2011 | Jiang et al. | |
| 7,955,500 B2 | 6/2011 | Abdalla et al. | |
| 8,020,708 B2 | 9/2011 | Husband et al. | |
| 2009/0020465 A1 | 1/2009 | Jiang et al. | |
| 2009/0065447 A1 | 3/2009 | Forrest et al. | |
| 2009/0127172 A1 | 5/2009 | Abdalla et al. | |
| 2010/0122952 A1 | 5/2010 | South et al. | |
| 2010/0140151 A1 | 6/2010 | Stamey et al. | |
| 2010/0213115 A1 | 8/2010 | Thomas et al. | |
| 2010/0276358 A1 | 11/2010 | Thomas et al. | |

OTHER PUBLICATIONS

U.S. Appl. No. 12/959,716, attached portion of Office Action dated Sep. 7, 2017, pp. 24-43, 20 pages. (Year: 2017).*

International Search Report for international application No. PCT/US2011/045891, dated Feb. 9, 2012 (3 pages).

Written Opinion of the International Searching Authority for international application No. PCT/US2011/045891, dated Feb. 9, 2012 (4 pages).

Extended European Search Report received for European Appln. No. 11813246.3 dated Dec. 4, 2013.

* cited by examiner

US 10,094,347 B2

NO FILTER NO RUN FILTER ASSEMBLY WITH AIR VENT

This application claims the benefit of U.S. Provisional Application No. 61/369,488, filed on Jul. 30, 2010, and entitled NO FILTER NO RUN FILTER ASSEMBLY WITH AIR VENT, which is herewith incorporated by reference in its entirety.

FIELD

This disclosure generally pertains to the field of filtration, and more particularly to a fuel filter assembly including an air vent that facilitates removing air from the fuel system.

BACKGROUND

Fuel filtration systems are known that are designed to prevent flow of fuel to an engine if no filter cartridge is installed or if the incorrect filter cartridge is installed. In these "no filter, no run" systems, not only must a filter be present, but the correct filter must be used, in order to allow fuel to flow to the engine.

SUMMARY

A "no filter, no run" filtration system that is designed to verify that a filter cartridge is present to safe-guard against damage to fuel injectors, associated fuel components, etc. engine malfunctions and consequently exhaust gas emission issues. Fuel flow to the engine is prevented altogether or permitted in an amount insufficient to allow engine operation if a filter cartridge is not installed, and an appropriately designed filter cartridge is required to be used in order to permit sufficient fuel flow for engine operation.

In one embodiment, a filter cartridge includes a filter media defining an interior space, and having a first end and a second end, a first end plate connected to the first end, a second end plate connected to the second end, and a center tube connected to the second end plate. A pin is connected to the center tube or the top end plate and extending downwardly into the interior space. The pin defines a flow passage threrethrough that communicates the interior space with an outside of the filter cartridge.

In another embodiment, a valve assembly for attachment to a fuel filter housing for controlling fuel flow through the fuel filter housing includes a valve body adapted for attachment to the fuel filter housing, where the valve body includes a first opening adapted to allow air to pass through and a second opening adapted to allow fuel to pass through. The first opening has an upper end and a lower end. The valve assembly also includes a valve ball sized to close the second opening.

In a further embodiment, a combination includes a filter housing having a housing body with a side wall and an end wall defining a filter cartridge space, and a standpipe extending from the end wall along a longitudinal axis into the filter cartridge space. The standpipe includes an air flow passage, and at least one opening in the standpipe that places the air flow passage in communication with the filter cartridge space. The standpipe is configured for disposition within the filter cartridge space. The cartridge includes a filter media suitable for filtering a fluid, a first end plate connected to a first end of the filter media, and a second end plate connected to a second end of the filter media. The first end plate or a center tube connected to the first end plate may include a pin having an opening therethrough that cooperates with the opening in the standpipe to allow air to travel from the cartridge space to the air flow passage. A restrictive passage may be included between the center tube and the second end plate to allow air to pass through.

DETAILED DESCRIPTION

Figure 1:
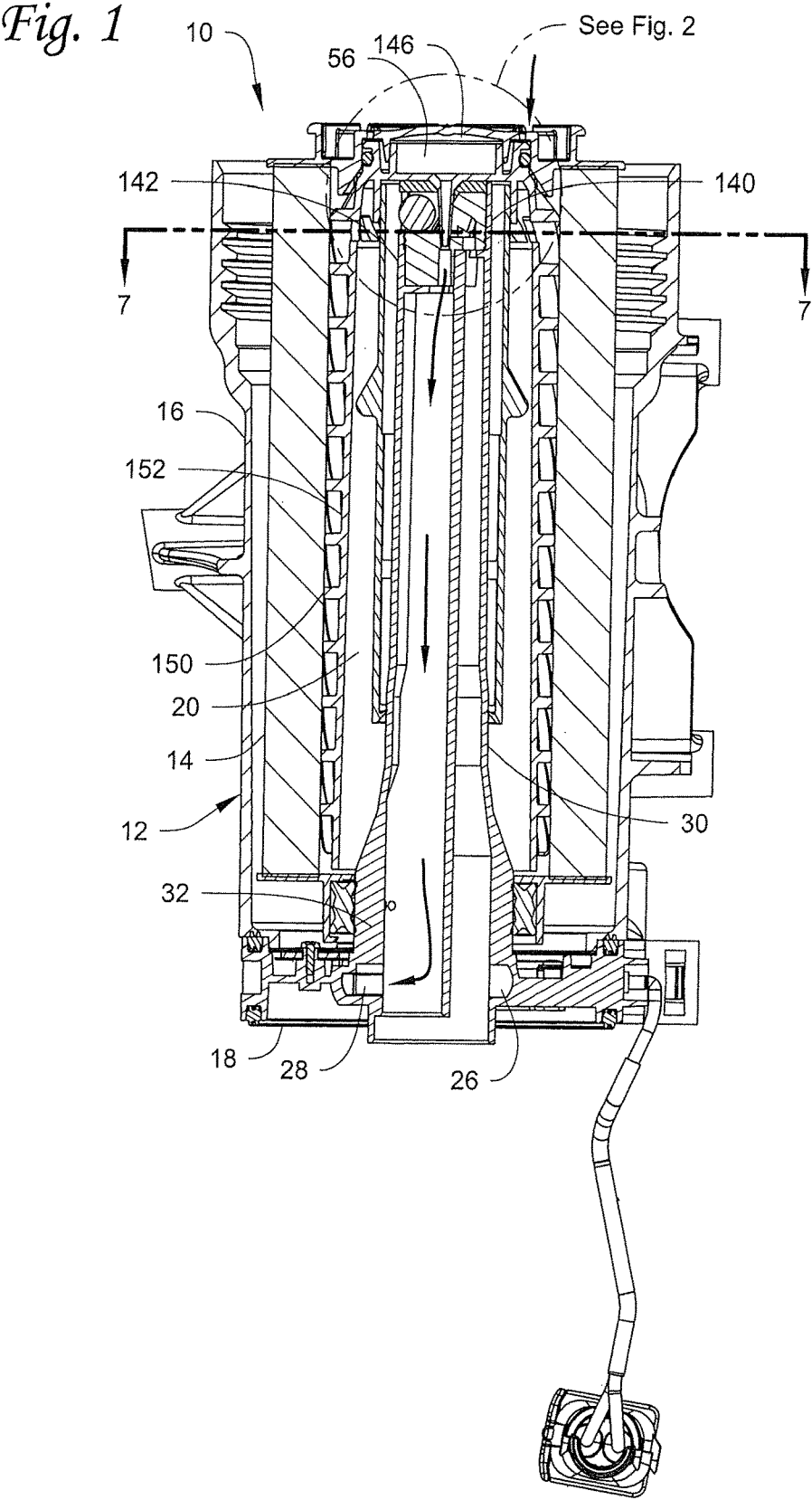
FIG. 1 is a cross-sectional view of a filter assembly that includes an embodiment of a filter cartridge in a filter housing.

FIG. 1 illustrates a filter assembly 10, for example a fuel filter assembly, which is intended to filter a fluid, for example diesel fuel, and remove water from the fluid before the fluid reaches a protected system, for example a fuel injection pump and fuel injectors. This description will hereinafter describe the fluid as fuel. However, it is to be realized that the concepts described herein can be used for other fluids. In addition, in appropriate circumstances, the concepts described herein can be used to remove contaminants other than water from the fluid. And, in appropriate circumstances, one or more of the concepts described herein can be applied to other types of filter assemblies that filter other types of fluids, for example lubrication, hydraulic and other liquids.

The assembly 10 includes a filter housing 12 that is designed to receive a filter cartridge 14 therein for filtering the fluid. The filter housing 12 includes a housing body that has a side wall 16 and an end wall 18. The side wall 16 and the end wall 18 define a filter cartridge space 20 that is large enough to receive the filter cartridge 14 therein, with the end wall 18 forming a closed end of the space 20. The housing body has an open end generally opposite the end wall 18. The housing body includes an inlet opening (not shown), through which fuel to be filtered enters the space 20, a clean fuel outlet 26 near the end wall 18, through which fuel exits on its way to the engine and an air outlet 28 also near the end wall 18 through which air, in the filter housing, returns to a fuel tank. It is to be realized that the filter housing 12 could have other configurations than that described herein.

The housing body also includes internal threads 98 formed at the upper end of the side wall 16. When the filter assembly is in use, a lid including external threads can be screwed onto the housing body by engaging the external threads of the lid with the internal threads 98.

Figure 2:
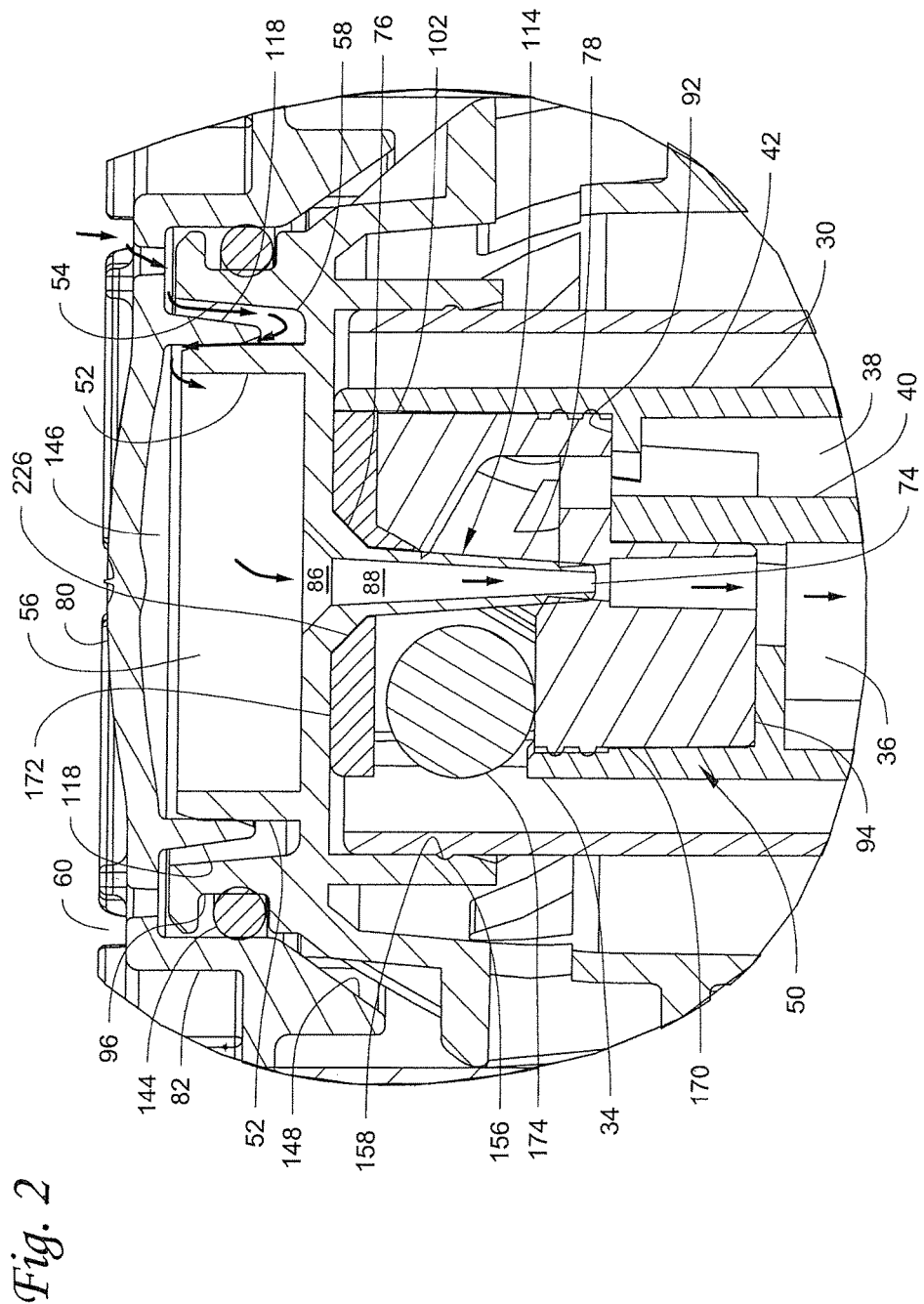
FIG. 2 is an enlarged view showing a top portion of the filter assembly of FIG. 1.
Figure 3:
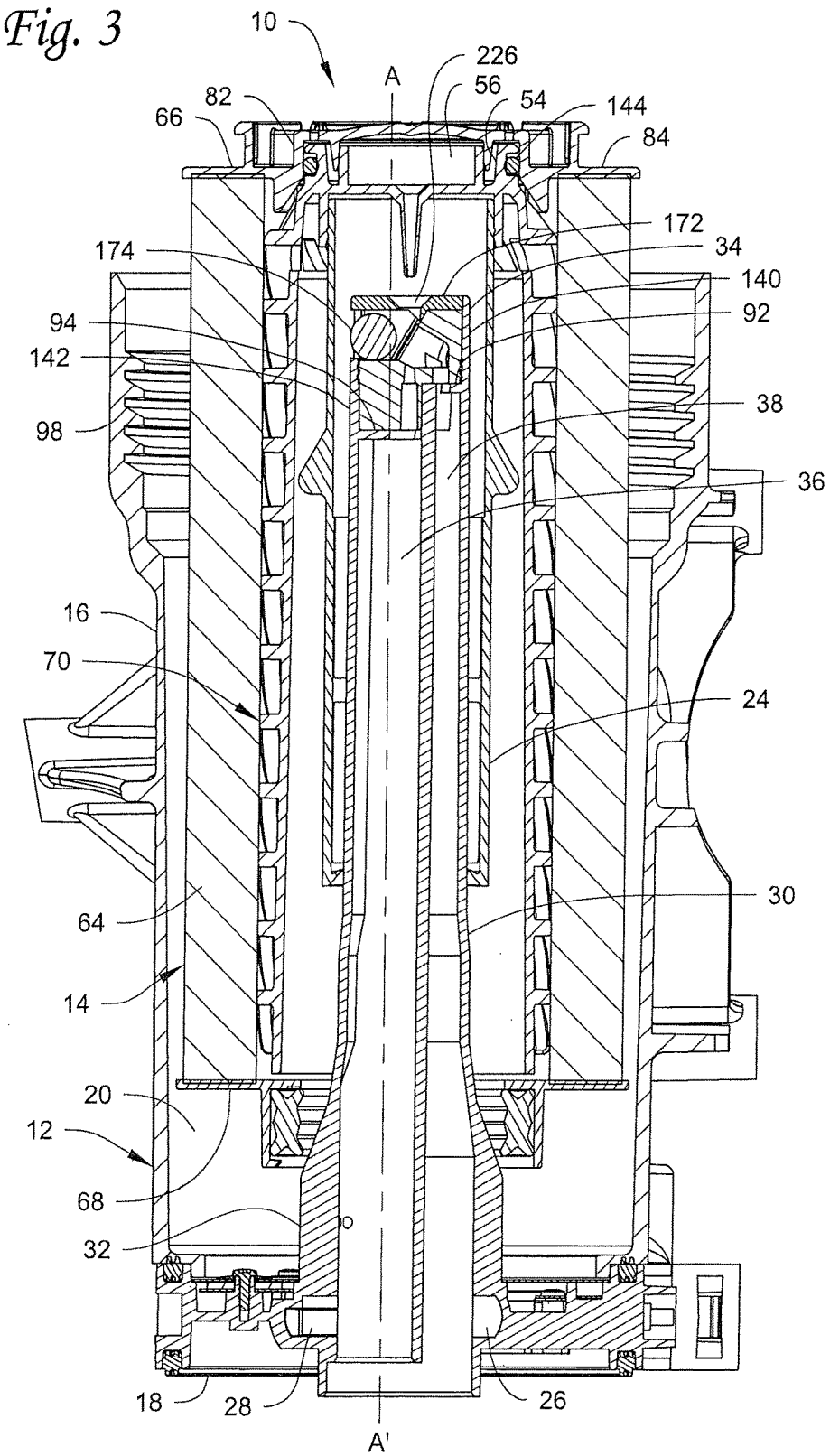
FIG. 3 is a cross-sectional view of the filter assembly of FIG. 1 with the valve assembly not being actuated.

With reference to FIGS. 2 and 3, a fluid passageway member in the form of a standpipe 30 is secured to the end wall 18 and extends upwardly into the space 20 toward the open end of the filter housing 12. The standpipe 30 includes a generally cylindrical body having a side wall 42 extending from its bottom end 32 adjacent the end wall 18 to a tip end 34 thereof. The side wall 42 encloses a space that is divided into an air flow passage 36 and a clean fuel flow passage 38 by a divider. In the illustrated embodiment, the divider is illustrated as being a cylindrical wall 40 tangent to the side wall of the standpipe, sharing a common portion of side wall with the standpipe. The cylindrical wall 40 has a smaller diameter than the side wall 42, where a longitudinal axis A-A' of the cylindrical body is off-center of the standpipe 30. In some embodiments, the cylindrical wall 40 can be concentric with the standpipe 30. The air flow passage 36 is in communication with the air outlet 28 so that the air that enters the standpipe 30 can flow from the standpipe and into the air outlet 28 to exit the fuel assembly and be directed back to the fuel tank. The clean fuel flow passage 38 is in communication with the clean fuel outlet 26 so that the clean fuel that enters the standpipe 30 can flow from the standpipe and into the clean fuel outlet 26 to the engine.

As illustrated in FIGS. 1-3, the standpipe 30 further includes a generally horizontal upper seat 92 and a generally horizontal lower seat 94 each having a support member 140, 142 extending upwardly along an outer perimeter of the seat 92, 94. The support members 140, 142 form a part of the side wall 42 of the standpipe body. As shown in FIGS. 1-3, each seat 92, 94 has a partial circular carved out portion to allow a respective fluid, e.g., air, clean fuel, etc. to pass through. The standpipe 30 is formed of a suitable material, for example plastic.

With reference to FIGS. 1-3, the standpipe 30 is illustrated as being circular-shaped from the bottom end 32 to the tip end 34. While this disclosure will describe the standpipe as being circular-shaped, it is to be realized that the concepts described herein could be used, individually or in various combinations, with an oval-shaped standpipe and with standpipes having other shapes.

With reference to FIGS. 1-3, the filter cartridge 14 includes a ring of filter media 64, an upper end plate 66 secured to an upper end of the media 64, a lower end plate 68 secured to a bottom end of the media 64, a center tube 70 and a strainer 24 disposed between the center tube 70 and the standpipe 30. The end plates 66, 68 are formed of a suitable material, for example plastic. Alternatively, the filter cartridge 14 can be a filter-in-filter type with an inner filter and an outer filter.

Fuel can include water therein in different forms, including free water, e.g. droplets, and emulsified water. In one embodiment, the filter media 64 strips out free water and filters particles from the fuel before the fuel enters the center of the filter cartridge. Water, being heavier than fuel, settles down to the bottom of the filter cartridge 14, and drains through openings to a water collection area at the base of the housing 12. The filtered fuel enters the standpipe 30 and flows to the outlet 26, leading to a downstream protected component, for example a fuel pump.

The outside of the filter media 64 generally faces inner surface of the housing 12, with the inner side of the media 64 defining a clean or filtered fuel side of the filter cartridge 14 and the outside of the media 64 defining a dirty or unfiltered fuel side, whereby the filter cartridge is configured for outside-in flow. In appropriate circumstances, the concepts described herein can be applied to inside-out type flow filter cartridges.

Figure 6:
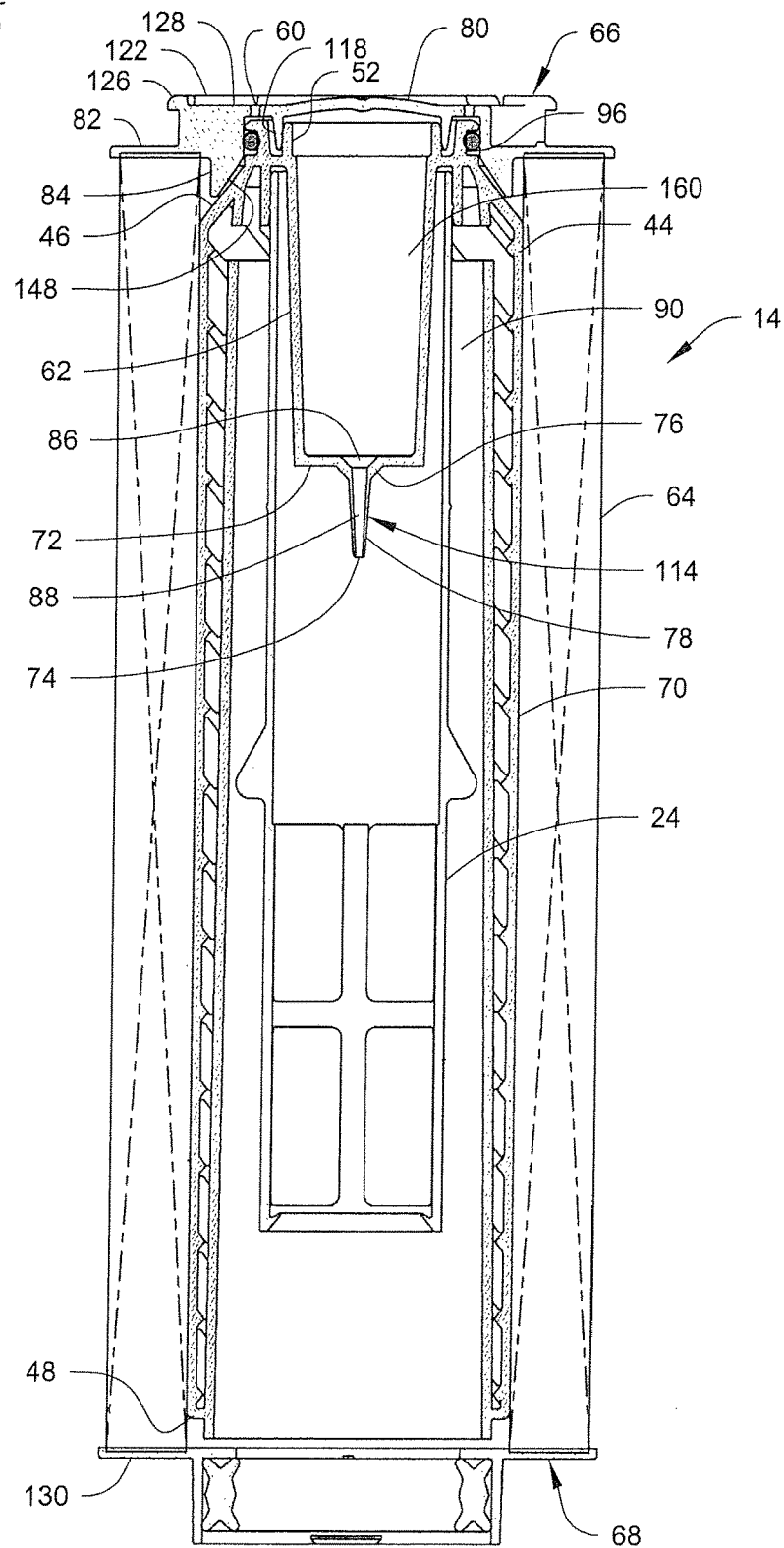
FIG. 6 is a cross-sectional view of the filter cartridge of FIG. 5 along line 6-6.
Figure 7:
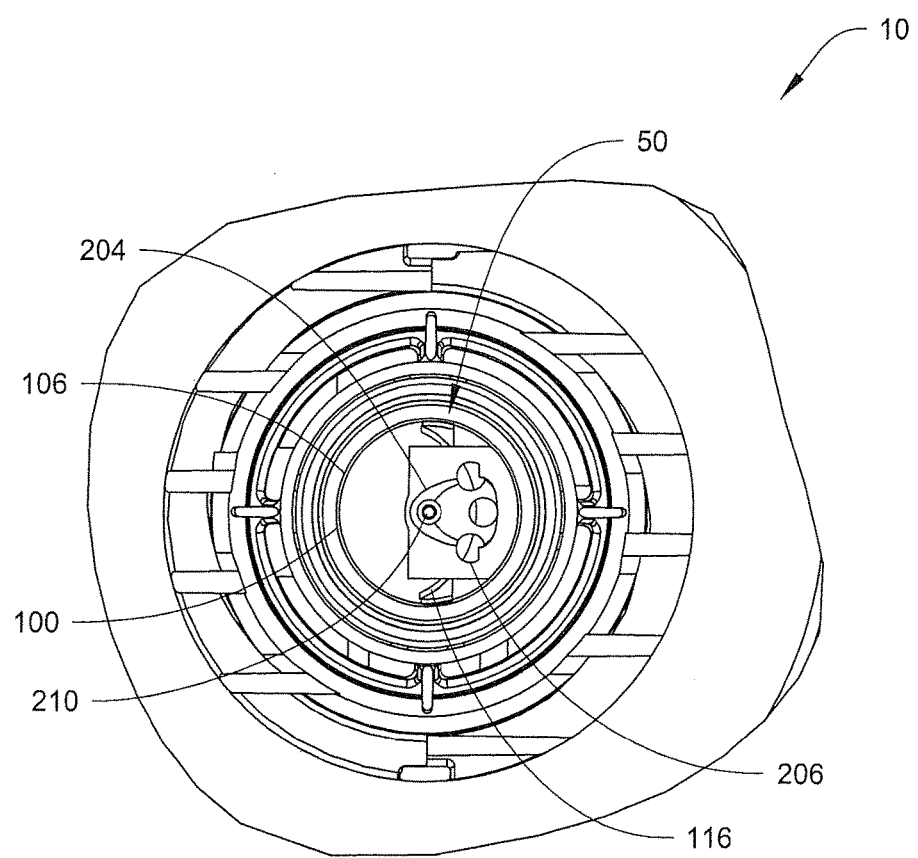
FIG. 7 is a cross-sectional view of the filter assembly of FIG. 1 along line 7-7.

The upper end plate 66, as illustrated in FIGS. 1-6, includes a generally circular, horizontal plate 80 for closing a top of a cavity 56 defined by the center tube 70. A skirt 118 extends downward from the plate 80 and defines a hollowed-out area that receives the upper end of the center tube 70 as shown in FIGS. 1-3. The edge of the plate 80 extends past the side wall of the skirt 118 and turns downwardly to form a flange 82. With reference to FIG. 6, the inner side 148 of the end of the flange 82 is illustrated as angling slightly outwardly. A plurality of air vent holes 60 are defined in the circular plate 80 between the skirt 118 and the flange 82 allowing air in the fuel system to enter the inner side of the filter media 64 (see arrows in FIGS. 1 and 2). In the example illustrated in FIGS. 1-6, four air vent holes 60 are formed in the circular plate 80. It is to be understood that other numbers of air vent holes can be used to allow air in the fuel system to pass through and enter the inner side of the filter media 64.

Figure 4:
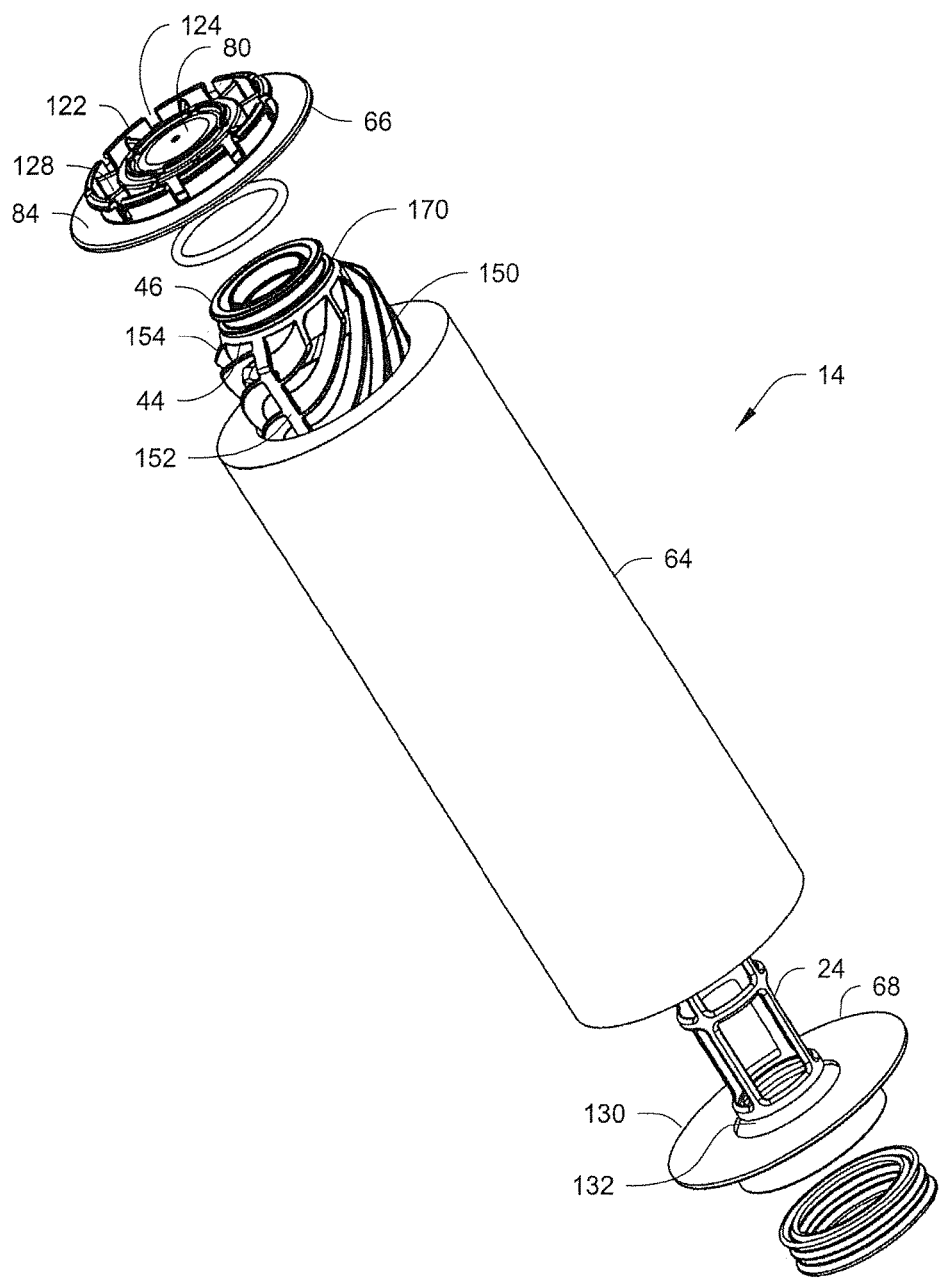
FIG. 4 is an exploded isometric view of another embodiment of the filter cartridge.
Figure 5:
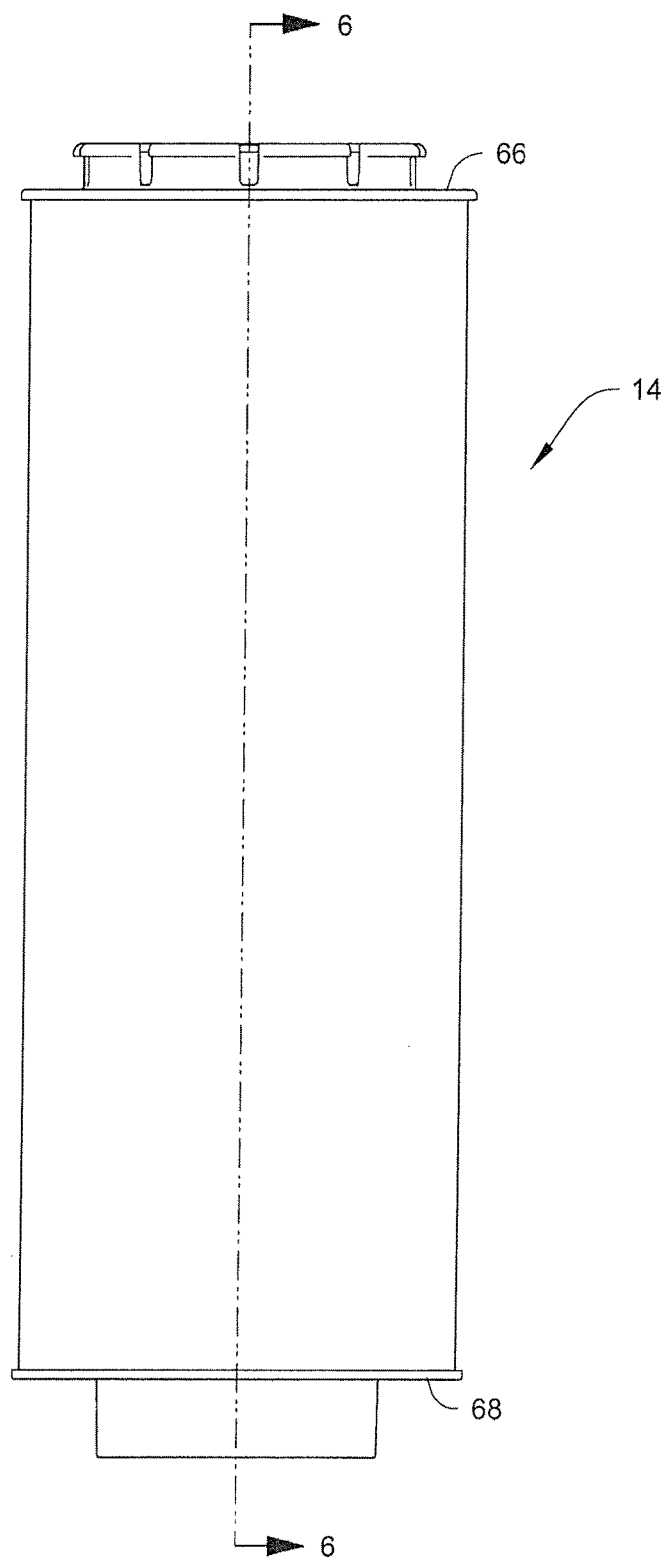
FIG. 5 is a side view of the filter cartridge of FIG. 4.

With reference to FIGS. 1-6, the upper end plate 66 also includes a generally ring shaped, horizontal plate 84, with the bottom surface thereof suitably attached to the upper end of the filter media 64, for example using an adhesive or using heat to embed the media 64 into the ring shaped plate 84. With reference to FIG. 4, a plurality of spaced tabs 122 project upwardly from an upper surface of the ring shaped plate 84. The tabs 122 have a generally constant width from their point of attachment to the ring shaped plate 84 to tip ends thereof. A gap 124 is provided between each tab 122. Each tab 122 includes a lip 126 extending outwardly by which the lid of the filter assembly 10 can engage with the upper end plate 66 via, e.g., a snap fit connection. A rib 128 extends between the inner surface of each tab 122 and an outer surface of the flange 82.

In the embodiment as illustrated in FIGS. 1-6, the circular plate 80, the ring shaped plate 84, the plurality of tabs 122 and the flange 82 are concentric. It is to be understood that other configurations and arrangements of the upper end plate 66 may be implemented.

The lower end plate 68 of the filter cartridge 14 is illustrated in FIGS. 1, 3-4 and 6. The end plate 68 includes a generally ring shaped, horizontal plate 130 which is suitably attached to the bottom end of the filter media 64, for example using an adhesive or using heat to embed the media into the plate 130. A standpipe hole 132 is formed at the center of the plate 130 which is configured to allow passage of the standpipe 30. In the illustrated embodiment, the hole 132 has a shape similar to the shape of the standpipe 30, for example circular. However, if the standpipe has a different shape, for example oval, then the hole 132 can have a shape, for example oval, similar to the shape of the standpipe.

The center tube 70 is disposed within the ring of filter media 64 to provide additional support for the filter media 64. With reference to FIG. 6, in the illustrated example, the center tube 70 has a tube body 44 defining a space 90, an upper end 46 secured to the upper end plate 66 and a lower end 48 secured to lower end plate 68. The tube body 44 includes a plurality of vertical ribs 152 extending from the upper end 46 to the lower end 48. Spiral shaped ribs 150 extend between the vertical ribs and form a plurality of openings allowing the fuel filtered by the filter media 64 to enter the space 90. At the portion 154 adjacent to the upper end 46, the vertical ribs 152 and the spiral shaped ribs 150 angle slightly inwardly to cooperate with the lower end of the flange 82 of the upper end plate 66.

The upper end 46 includes an inner short wall 52 and an outer short wall 54 both projecting upwardly, with the inner and outer short walls being concentric with each other. The inner short wall 52 defines the cavity 56 and is secured into the skirt 118 of the upper end plate 66 by press fit, with the circulate plate 80 of the upper end plate 66 positioned to close the top of the cavity 56. A dented section 58 is formed on the outer surface of the inner short wall 52 along a longitudinal axis of the inner short wall 52 and extends longitudinally through the entire press fit interface. The dented section 58 allows air entering through the air vent holes 60 to pass through and enter the cavity 56 (see arrows in FIGS. 1 and 2).

The upper edge of the outer short wall 54 extends outwardly to form a slot 96 around the outer perimeter of the outer short wall 54. The slot 96 receives an O-ring seal 144 that is designed to seal with an inner surface of the flange 82 of the upper end plate 66 to form a fluid tight sealing. The O-ring seal 144 works with the press fit connection between the skirt 118 and the inner short wall 52 to help to retain the center tube 70 to the upper end plate 66. In the example illustrated in FIG. 6, the center tube 70 cooperates with the filter media 64 in a concentric configuration.

In one embodiment as shown in FIGS. 1-3, an end wall 72 is formed at the lower end of the short wall 52. In an alternative embodiment in FIGS. 4-6, an annular wall 62 extends downward and angles slightly inwardly from the upper end 46 of the center tube 70 toward and into the space 90. At its lower edge, the annular wall 62 extends radially inward and forms a generally horizontal end wall 72. The annual wall 62 and the end wall 72 defines a space 160 that is in fluid communication with the cavity 56 defined by the inner short wall 52, with a diameter of an upper end of the annual wall 62 being slightly smaller than the diameter of the lower end of the inner short wall 52.

A pin 114 projects downwardly from the center of the end wall 72. The pin 114 includes a base portion 76 extending downwardly from the center of the end wall 72 and a main body 78 extending further down from the lower edge of the base portion 76, where the side of the base portion 76 has a slope relative to a horizontal plane that is smaller than the side of the main body 78.

An opening 74 is formed at the center of the end wall 72 and extends through the entire length of the pin 114. The opening 74 includes an upper section 86 defined in the base portion 76 and a lower section 88 defined in the main body 78, where the side wall of the upper section 86 has a slope relative to a horizontal plane that is smaller than the side wall of the lower opening 88. The opening 74 has an upper mouth defined at the upper surface of the end wall 72 and a lower mouth defined at a free end of the pin 114. The upper mouth has a greater diameter than the lower mouth. The opening 74 in the pin 114 communicates with the cavity 56 to allow air to flow through the pin 114. The pin 114 is designed to interact with a valve assembly 50 in a manner to be described below.

The strainer 24 is disposed within the center tube 70 to further strip out free water and remove particles from the filtered fuel. It is to be understood that the strainer could also be sued to remove other unwanted foreign matter depending on usage. With reference to FIGS. 1-3 and 5-6, the strainer 24 is illustrated as being retained to the center tube 70 by engaging a protrusion 156 formed around the outer perimeter of the strainer 24 with a groove 158 formed on the center tube 70.

A flow restriction valve assembly 50 is disposed at the tip end 34 of the standpipe 30 to control the flow of fuel into the standpipe 30 and to provide an air passage leading to the outside of the filter assembly 10. The valve assembly 50 can prevent fuel flow into the standpipe when the filter cartridge 14 is not installed or when an incorrect filter cartridge is installed. In some embodiments described herein, when the filter cartridge 14 or other appropriately designed filter cartridge is installed, the filter cartridge 14 is designed to interact with the valve assembly 50 in such a manner as to keep the valve assembly 50 from preventing fuel flow into the standpipe 30 and at the same time allowing air in the fuel system to flow through the air flow passage 36 and exit to the outside of the fuel assembly 10 (see arrows in FIGS. 1 and 2).

The tip end 34 of the standpipe 30 is open, and the valve assembly 50 is secured in the open tip end and rests on the upper and lower seats 94 and 92 of the standpipe, as shown in FIGS. 1-3. With reference to FIGS. 2 and 8A-D, the valve assembly 50 includes a valve body 170, a valve cap 172, and a valve ball 174. The valve body 170 includes a portion that is configured to fit within the end 34 of the standpipe 30. In the case of the circular-shaped standpipe, the portion of the valve body 170 within the standpipe will be generally circular-shaped to fit closely within the standpipe. An example of a valve body, a valve cap and a valve ball is disclosed in U.S. Pat. No. 7,867,387, which is herein incorporated by reference in its entirety.

Figure 8A:
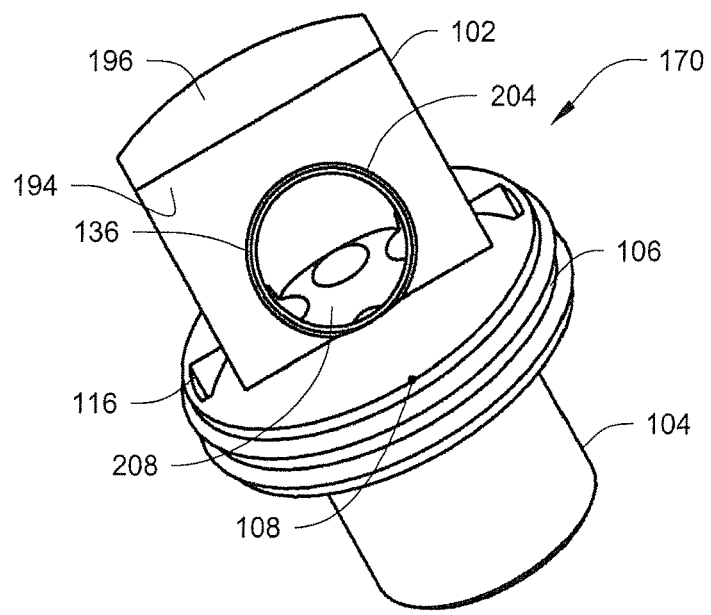
FIG. 8A is a perspective view of a valve body.
Figure 8B:
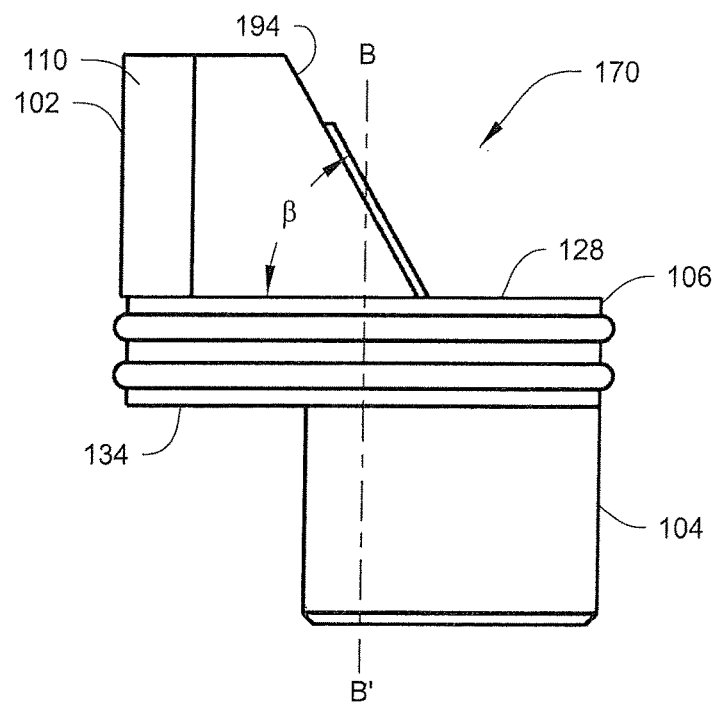
FIG. 8B is a front view of the valve body.
Figure 8C:
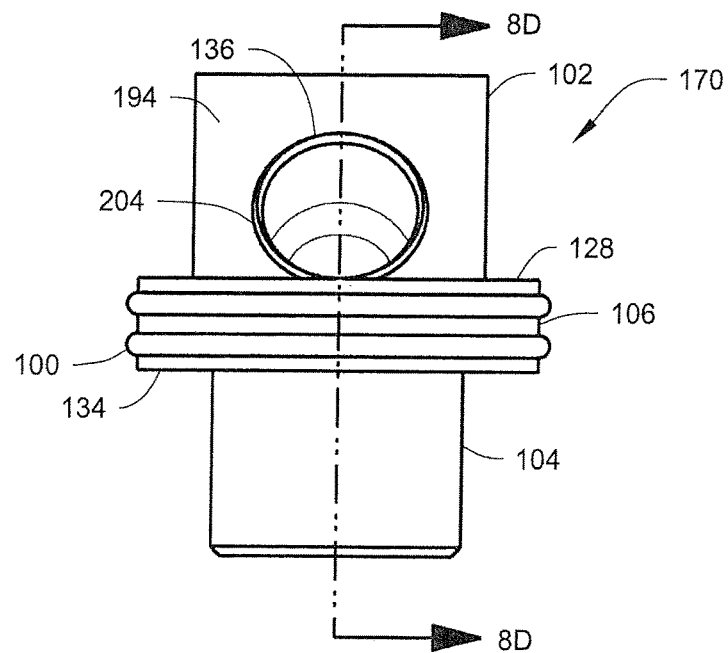
FIG. 8C is a side view of the valve body.
Figure 8D:
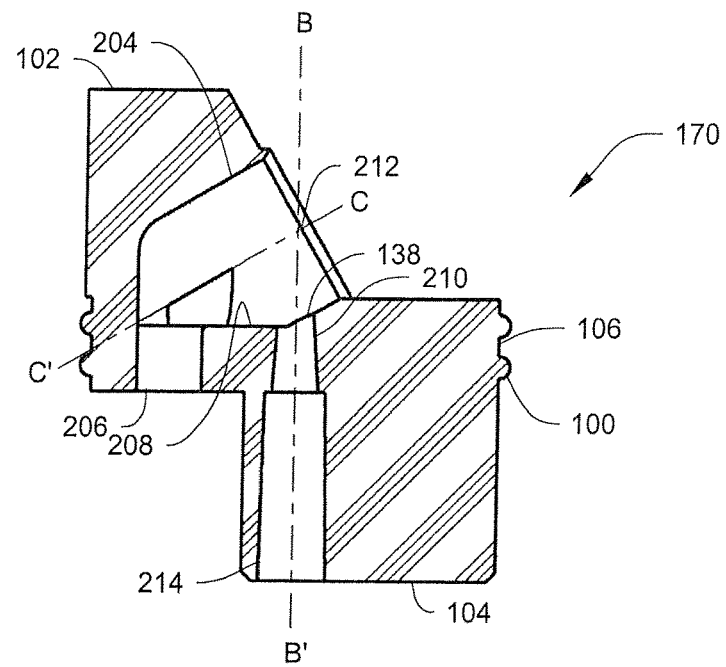
FIG. 8D is a cross-sectional view of the valve body of FIG. 8C along line 8D-8D.

With reference to FIGS. 8A-D, the valve body 170 has a gasket portion 106 including an upper surface 128 and a lower surface 134, an upper portion 102 projecting upwardly from the upper surface 128 and a lower portion 104 projecting downwardly from the lower surface 134. The gasket portion 106 includes a generally cylindrical shaped body 120 for preventing fluid from migrating through the joints of the housing and the valve body 170. The gasket portion 106 has a central axis B-B'. The lower portion 104 is generally cylindrical shaped and is tangent to the perimeter of the gasket portion 106 at a tangent point 108 as shown in FIGS. 8A-B. The upper portion 104 is positioned opposite to the lower portion 102 across a diameter of the gasket portion 106.

The valve body 170 is made of a suitable resilient material having a predetermined resistance, for example, rubber, so that an effective sealing is obtained at a sealing face and in the meantime, the valve body is not easily deformed.

The upper portion 102 includes a curved side 110 extending upwardly from the outer perimeter of the gasket portion 106 at a section opposite to the tangent point 108, where the curved side 110 has the same radius as and shares a common perimeter with the gasket portion 106. On the opposite of the curved side 110, a slanted side 194 extends upwardly from the upper surface 128 of the gasket portion 106. The upper portion 102 also includes two parallel sides 112 extending upwardly from the upper surface 128 of the gasket portion 106 and positioned symmetrically to the axis B-B', and a top surface 196 positioned parallel to the upper surface 128 of the gasket portion 106.

A circular upper fuel opening 204 is defined in the slanted side 194 and extends toward the curved side 110 with a central axis C-C' perpendicular to the slanted side 194. The lower perimeter of the opening 204 on the slanted side 194 is tangent to a bottom edge of the side 194. The ball 174 is configured to block the opening 204 to prevent fuel flow into the standpipe. A rim 136 is formed around the entrance of the opening 204 to restrict the ball 174 from inappropriately blocking the opening 204. The wall 194 is disposed at an acute angle β, for example about 85 degrees, relative to the upper surface 128 of the gasket portion 106. Angling of the wall 194 in this manner minimizes the chances of the ball 174 getting stuck in position blocking the opening 204.

The upper portion 102 may further include a ball track to allow the ball 174 to roll along therein. Further information on the construction of the upper portion of the valve body, including the ball track, can be found in U.S. Pat. No. 7,867,387.

The lower portion of the upper fuel opening 204 extends into the gasket portion 106 and carves out a portion of the gasket portion 106. The lower end 208 of the opening 204 is positioned parallel to and slightly lower than the upper surface of the gasket portion 106. A plurality of lower fuel openings 206 are defined in the thickness of the gasket portion extending downwardly from the lower end 208. Each opening 206 is tangent to the perimeter of the lower end 208 along a section closer to the outer perimeter of the gasket portion 106. The lower fuel openings 206 each has a diameter that is smaller than the diameter of the upper fuel opening 204 to provide effective strength to resist radial deformation of the valve body 170. In the examples illustrated in FIGS. 1-2, 7 and 8A-D, three lower fuel openings 206 are implemented. However, it is to be understood that the number of the lower fuel openings can vary depending on usage.

An upper air opening 210 is defined in the thickness of the gasket portion 106 along the central axis B-B'. The opening 210 has a decreased diameter from a lower end defined at the lower surface 134 of the gasket portion 106 to an upper end where it meets with the wall of the upper fuel opening 204. That is, the wall of the opening 210 angles inwardly at least at its upper end 138, allowing a tighter sealing engagement to be formed at a sealing face with the pin 114 of the filter cartridge 14, when the pin 114 engages with the opening 210. The opening 210 is concentric with the gasket 106, with its axis B-B' crossing the axis C-C' of the opening 204 at a center 212 of the opening 204 on the slanted side 194 of the upper portion 102. The upper and lower fuel openings 204, 206 cooperate with each other, allowing the cleaned fuel to pass through and enter the clean fuel flow passage 38.

To aid in retaining the gasket portion 106 in the standpipe 30, at least one elongated bump 100 is formed around the outer perimeter of the gasket portion 106, which engages with an inner surface of the standpipe 30 and forms a fluid tight seal. It is to be understood that the number of bumps 100 can vary depending on usage such as the type of fluid, the temperature, and the pressure at the sealing face. Slots 116 are formed in the upper surface 128 of the gasket portion 106 for attachment with the valve cover 172.

With reference to FIGS. 8A-D, the lower portion 104 is in a cylindrical shape, where the diameter of the lower portion 104 is greater than the radius of the gasket portion 106 and slightly smaller than a width between the two parallel side walls 112 of the upper portion 102. A lower air opening 214 is formed in the lower portion 104 extending from a lower end of the upper air opening 210 to the bottom end of the lower portion 104. The diameter of the lower air opening 214 is greater than the diameter of the upper air opening 210 at the lower surface of the gasket portion 106.

With reference to FIG. 3, the valve cap 172 is designed to be secured to the top of the valve body 170, confining the ball 174 on the upper surface 128 of the gasket portion 106. The valve cap 172 includes an opening 222 that is formed through a side wall of the valve cap 172, placing the exterior of valve assembly 50 in fluid communication with the interior of the valve assembly, and thus in communication with the opening 204 and the clean fuel passage 38 in the standpipe.

The valve cap 172 includes an opening 226 extending through a top of the cap 172. The opening 226 permits the pin 114 on the filter cartridge 14 to extend therethrough when the cartridge is installed, with the pin 114 extending through the opening 226 and into the upper air opening 210 defined in the valve body 170. The free end of the pin 114 clears the inwardly angled wall at the upper end 138 of the upper air opening 210 and forms an effective fluid tight sealing at the sealing face.

The upper and lower air openings 210, 214 cooperate with each other, allowing air in the cavity 56 of the upper end plate 66 to pass through the opening 74 defined in the pin plate 114, travel through the upper and lower air openings 210, 214, enter into the air flow passage 36 and exit to the outside of the fuel assembly 10, e.g., the fuel tank, through the air outlet 28 (see arrows in FIGS. 1 and 2). In addition to allowing air to pass through into the openings 210, 214, the pin 114 also helps prevent the ball 174 from moving back to block the opening 204 when the cartridge 14 is installed.

The operation of the valve assembly 50 should be apparent from the description above. When the filter cartridge 14 is not installed, the ball 174 remains on the upper surface of the gasket portion 106 as shown in FIG. 3. When sufficient fuel pressure acts on the ball 174 with no filter cartridge present, the ball 174 is forced up to the closed position blocking the opening 204. When the ball 174 seats in the opening 204 when no filter cartridge (or an incorrect filter cartridge) is installed, the flow of fuel into the standpipe is substantially completely prevented. The word prevention as used herein, unless indicated otherwise either in the written description or claims, is meant to include complete shut off of fuel into the standpipe as well as including some flow of fuel into the standpipe, as long as the amount of fuel that passes is insufficient to permit engine operation.

Upon installation of the filter cartridge 14, the pin 114 extends downward into the upper air opening 210, allowing air in the cavity 56 of the upper end plate 66 to pass through the pin 114, enter into the air flow passage 36 and exit to the outside of the fuel assembly 10, e.g., the fuel tank, through the air outlet 28 (see arrows in FIGS. 1 and 2). In the meantime, the pin 114 blocks the ball 174 from moving up to the closed position. Since the pin 114 blocks the track 200, the ball 174 cannot move to a position blocking the opening 204. Under operating conditions, the pressure of the fuel will force the ball up and into engagement with the pin 114. The opening 222 will be open allowing a maximum amount of fuel to enter the opening 222. The fuel flows past the ball 174 and pin 114, into the opening 204, and into the flow passage 36 of the standpipe to the outlet 26.

The invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A filter cartridge, comprising:
   a filter media defining an interior space, and having a first end and a second end;
   a first end plate connected to the first end;
   a second end plate connected to the second end,
   a center tube connected to the second end plate, a pin being formed as a single piece with the center tube and extending away from second end plate into the interior space, the pin defining a flow passage therethrough, the center tube defining an inner cavity between the second end plate and the pin, the inner cavity structured to receive air, wherein engagement of the pin with an air flow passage places the air in the inner cavity in communication with an outside of the filter cartridge through the flow passage of the pin.

2. The filter cartridge of claim 1, wherein the inner cavity comprises an annular press fit interface formed between the second end plate and the center tube or formed between components of the second end plate, a restrictive passage extending through the press fit interface to communicate a filter cartridge space with the flow passage defined in the pin.

3. The filter cartridge of claim 1, wherein the filter cartridge is adapted to allow clean fuel to enter into a passage formed in the interior space.

4. The filter cartridge of claim 1, wherein the second end plate includes a generally circular shaped body that has a plurality of annularly arranged, equally spaced holes to communicate a filter cartridge space with the flow passage defined in the pin.

5. The filter cartridge of claim 1, wherein the first end plate is in an annular shape.

6. A combination of:
a filter housing having a housing body with a side wall and an end wall defining a filter cartridge space, a standpipe extending from the end wall along a longitudinal axis into the filter cartridge space, the standpipe including an air flow passage, and at least one opening in the standpipe that places the air flow passage in communication with the filter cartridge space;
a filter cartridge configured for disposition within the filter cartridge space, the cartridge including a filter media suitable for filtering a fluid, a first end plate connected to a first end of the filter media, a second end plate connected to a second end of the filter media; a pin formed as a single piece with a center tube that is connected to the second end plate and
a restrictive passage defined between the center tube and the second end plate or defined in the second end plate to allow air to pass through, the pin having an opening therethrough, wherein engagement of the pin with the at least one opening pace the air in the restrictive passage in communication with the air flow passage.

7. The combination of claim 6, wherein the standpipe further includes a fuel passage separate from the air flow passage.

8. The combination of claim 6, wherein the standpipe is made of plastic.

9. The combination of claim 6, further comprising a valve assembly including a valve body that is made of resilient material.

10. The combination of claim 6, wherein the at least one opening is a first opening, further comprising a valve assembly that includes a valve body adapted for attachment to the filter housing, the valve body including the first opening adapted to allow air to pass through and a second opening adapted to allow fuel to pass through.

11. The combination of claim 10, wherein the first opening includes an inwardly angled upper end such that the upper end of the first opening has a smaller diameter than the diameter of a lower end of the first opening, the inwardly angled upper end cooperating with the pin, thereby forming a fluid tight sealing at a sealing face with the pin, when the pin engages with the first opening.

12. The combination of claim 6, wherein a press fit interface is formed between the center tube and the second end plate or formed between components of the second end plate, the restrictive passage extending vertically through the press fit interface to allow air to communicate the filter cartridge space with a passage defined in the pin.

13. The combination of claim 6, wherein the pin is configured not only to communicate the filter cartridge space with the air flow passage, but also to prevent a valve ball from blocking the air flow passage and a fuel passage, when the filter cartridge is installed.

* * * * *